United States Patent [19]

Benkley et al.

[11] 4,170,025

[45] Oct. 2, 1979

[54] LOW CONTRAST MEASUREMENT APPARATUS

[75] Inventors: Fred G. Benkley; Gerhard O. Sauermann, both of Lexington, Mass.

[73] Assignee: The United States of America as represented by the Secretary of the Air Force, Washington, D.C.

[21] Appl. No.: 913,187

[22] Filed: Jun. 6, 1978

[51] Int. Cl.² .............................................. H04N 7/02
[52] U.S. Cl. ..................................... 358/139; 358/169
[58] Field of Search ........................ 358/139, 169, 10

[56] References Cited

U.S. PATENT DOCUMENTS

| 3,008,001 | 11/1961 | Reith | 358/139 |
| 3,205,446 | 9/1965 | Altemus | 358/169 |
| 3,875,328 | 4/1975 | Gibson et al. | 358/139 |

Primary Examiner—Robert L. Richardson
Assistant Examiner—Edward L. Coles
Attorney, Agent, or Firm—Joseph E. Rusz; William Stepanishen

[57] ABSTRACT

A low contrast measurement apparatus for electronically measuring video signal modulation under low contrast scene conditions. The measurement apparatus utilizes a low contrast periodic optical bar chart in conjunction with a filter-integrator processor to measure very low contrast ratios.

The filter-integrator processor contains a filter which is tuned to the corresponding fundamental frequency of the bar chart, thereby reducing the noise bandwidth and consequently improving the signal-to-noise ratio. The filtered signal is integrated over one whole picture frame which results in an improved signal to noise ratio. The integrated output of the filtered video signal constitutes a linearly increasing ramp with a period equal to the frame time and whose height is proportional to the amplitude of the periodic signal.

8 Claims, 2 Drawing Figures

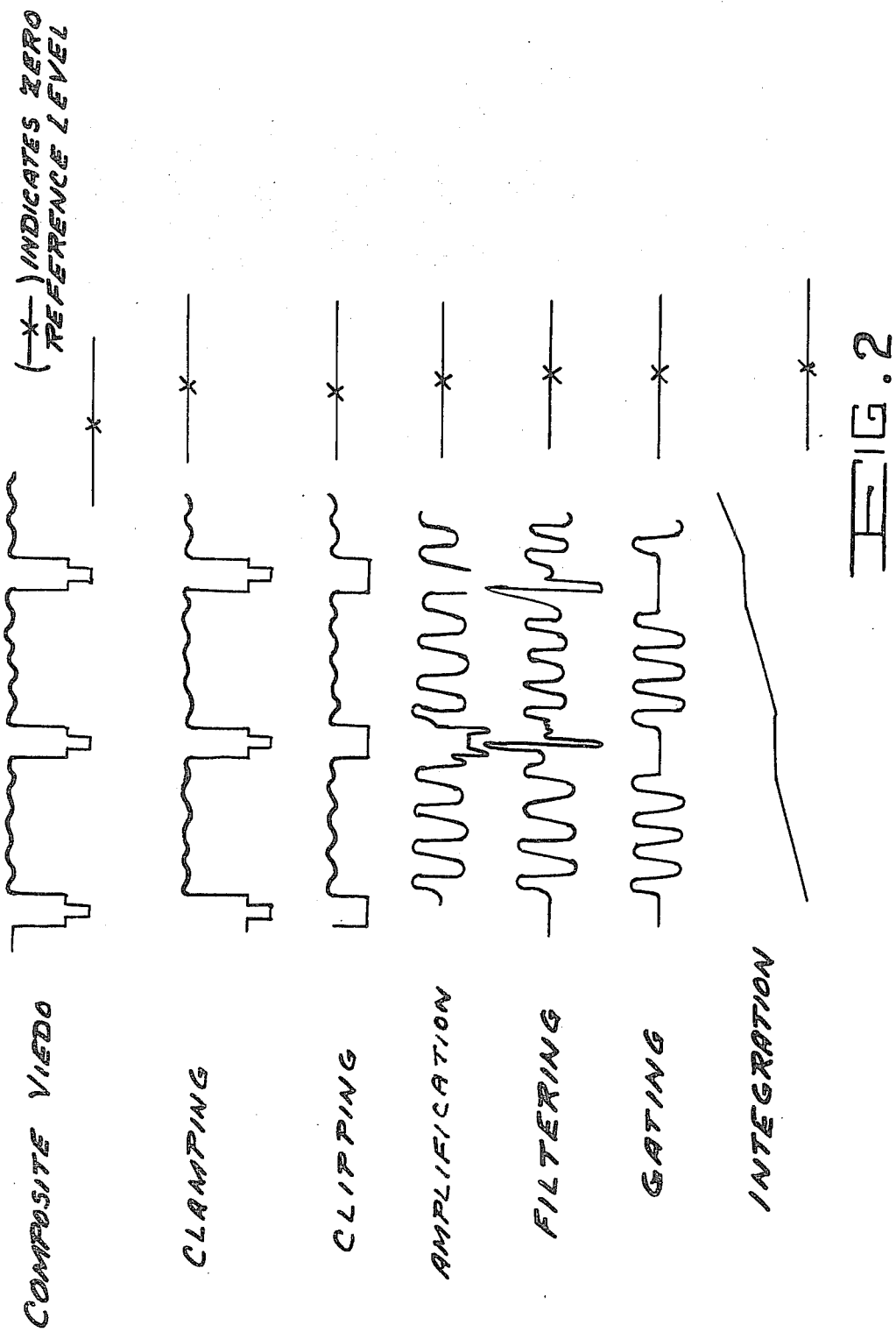

LOW CONTRAST MEASUREMENT APPARATUS

STATEMENT OF GOVERNMENT INTEREST

The invention described herein may be manufactured and used by or for the Government for governmental purposes without the payment of any royalty thereon.

BACKGROUND OF THE INVENTION

The present application relates broadly to measurement apparatus, and in particular to a low contrast measurement apparatus for the measurement of low contrast ratios on video signals in television systems.

In the prior art, it is an established fact that an observer can identify a low contrast scene on a TV monitor even when the trace of the video signal on an oscilloscope does not show any measurable modulation. As a result there exists a need to be able to electronically measure the condition, since camera performance standards are usually given in terms of variations of the video output signal. Therefore, new techniques have to be developed to measure changes in the video signal which represent a very low contrast scenes. The sensitivity of the electronic measuring device has to reach or surpass the discrimination capability of the eye of an human observer. These techniques, in turn, have to be suitable for obtaining quantitative results which may be used to define new standards.

SUMMARY OF THE INVENTION

The present invention utilizes a video signal which is obtained from a closed circuit TV camera focused on a test target with a mechanical low frequency chopper interposed between the target and the camera to provide a fluctuating signal. The video signal is coupled to a TV monitor for display of low contrast scenes that are observable to the human eye and to a signal processing unit. The signal processing unit comprises a video amplifier having clamping circuits to eliminate dc offsets and clipping circuits to remove sync pulses. The resultant video signal is filtered at 400 KHz then gated to eliminate transient signals and then integrated to produce a linearly increasing ramp signal with a period equal to the frame time and a height proportional to the amplitude of the periodic signal. The ramp signal is displayed on an oscilloscope which depicts the signal modulation of the video signal.

It is one object of the present invention, therefore, to provide an improved low contrast measurement apparatus utilizing frequency filtering and subsequent integration of video signals to increase the signal to noise ratio therein.

It is another object of the invention to provide an improved low contrast measurement apparatus utilizing the integration of the periodic component of the video signal over an entire picture frame.

It is yet another object of the invention to provide an improved low conrast measurement apparatus wherein signal measuring sensitivity is increased and enchanced by displaying the chopped D.C. output of the integrator over many TV frames.

It is still another object of the invention to provide an improved low contrast measurement apparatus wherein the sensitivity of the contrast measurements are improved by a factor of 80 to 100 over conventional methods.

These and other advantages, objects and features of the invention will become more apparent after considering the following description taken in conjunction with the illustrative embodiment in the accompanying drawings.

BRIEF DESCRIPTION OF THE DRAWINGS

FIG. 2 is a graphical representation of typical waveforms that are utilized in the signal processing unit.

DESCRIPTION OF THE PREFERRED EMBODIMENT

Figure 1:
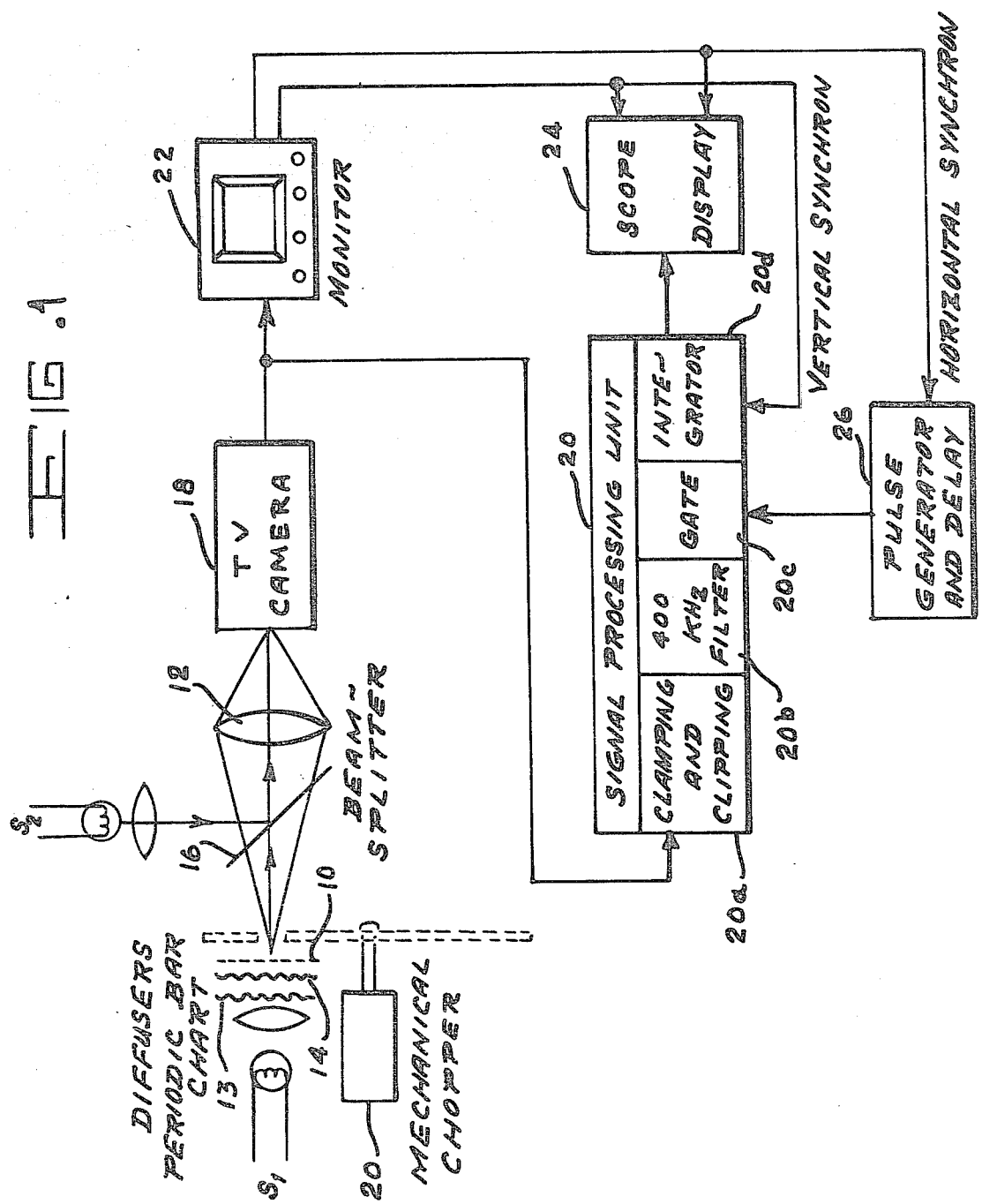
FIG. 1 is a block diagram of the low contrast measurement apparatus in accordance with the present invention.

The present invention is a low contrast measurement apparatus for measuring very low contrast ratios in TV systems by using a low contrast periodic optical bar chart together with a filter-integrator processor. The processor unit contains a filter that is tuned to the corresponding fundamental frequency of the bar chart thereby reducing the noise bandwidth and improving the signal-to-noise ratio. The filtered signal is then integrated over one complete picture frame which results in the substantial improvement of the signal-to-noise ratio. The integrated output of the filtered video signal comprises a linearly increasing ramp with a period equal to the frame time and its height is proportional to the amplitude of the periodic signal. By using an optical chopper and displaying these ramps on an oscilloscope with a time deflection that is large compared to the frame time, the output of the integrator becomes a series of vertical pulses with amplitudes modulated by the chopper frequency. As a result, there is achieved a further increase in sensitivity. The present low contrast measurement apparatus provides improvement in the sensitivity of modulation measurement by a factor of between 80 and 100 over prior art techniques. It also will allow measurements to be made at high light levels when contrasts are as low as 0.1 percent.

Referring now to FIG. 1 there is shown the low contrast measurement apparatus utilizing a closed circuit TV camera, an illumination and projection unit, the electronic processor, a TV monitor and an oscilloscope. In the present example, the TV camera may be a well known type, such as the Jerrold TVG 500, the TV monitor, a Panasonic TN95 and the oscilloscope, a Tektronix. Light from a low voltage projection lamp $S_1$ illuminates the test target 10, which is comprised of evenly spaced black and white vertical bars of approximately 0.15 mm width. A 170 mm focal length lens 12 images the test chart on the photocathode of the camera 18. Two diffusers 13, 14 between the lamp $S_1$ and the test target provide uniform illumination of the target. A thin glass plate 16 (thickness approximately 0.1 mm) is placed in front of the lens 12, and light from a second low voltage projection lamp $S_2$ can be superimposed on the photocathode in order to obtain a uniform dc bias and therefore vary the apparent contrast of the test object. Both light-levels, the direct illumination of the target and the background illumination may be adjusted independently to obtain different contrast and light level settings. A mechanical low frequency chopper 20 is placed between the test target 10 and the lens 12 in order to provide a fluctuating signal. The chopper provides improved visual observation of low modulation signals.

The output video signal from the camera 18 is provided as an input to the signal processing unit 20, as well as to a TV monitor 22. The processed and integrated output signal from the signal processing unit 20 is displayed on an oscilloscope 24. The video signal from the camera 18 enters a video amplifier 20a which has appropriate clamping circuits to eliminate dc offsets and clipping circuits to remove the sync pulses. Subsequently, the modified video signal is amplified and passes through a narrow bandpass filter 20b. The center frequency of this filter is 400 KHz, which is identical to the fundamental of the modulation frequency of the video signal caused by the bar chart. The modulation of the video signal may easily be adjusted to exacly 400 KHz by changing the distance and subsequently the magnification between bar chart and the photocathode of the camera vidicon. The filtered signal enters a gating circuit 20c which eliminates transients caused by ringing in the bandpass filter during the period of the horizontal sync pulse. The gate 20c is activated by pulses from a pulse generator 26 which, in turn, is triggered by the horizontal sync pulse of the video signal. After the signal leaves the gating circuit 20c, it is comprised only of a sine wave of 400 KHz, present during the time of the horizontal line scan (approximately 47 sec), that has a zero amplitude during the gating interval (approximately 17 msec). The integrator 20d is pulsed by the vertical sync pulse, which resets the integrator to zero. There is shown in FIG. 2 the idealized waveforms of the video signal which are received from the TV camera 18 and how they are changed in the processing unit 20 at the various identified points.

It is to be noted that although there have been described the fundamental and unique features of our invention as applied to a preferred embodiment, various other embodiments, variations, adaptations, substitutions, additions, omissions, and the like may occur to, and can be made by, those of ordinary skill in the art, without departing from the spirit of the invention.

What is claimed is:

1. A low contrast measurement apparatus comprising in combination:
    a test pattern generation means providing a periodic bar chart,
    a video camera means receiving said periodic bar chart, said video camera means providing a video output signal in response to said periodic bar chart,
    a signal processing means receiving said video output signal, said signal processing means processing said video output signal to eliminate d.c. offsets and sync pulses and filtering said video output signal at a predetermined frequency to provide a filtered video signal, said signal processing means gating said filtered video signal to eliminate transient signals, said filtered video signal is integrated over one entire picture frame to provide a linearly increasing ramp signal; and,
    a display means connected to receive said ramp signal, said display means providing a visual representation of said ramp signal, said visual representation has a period equal to the frame time of said camera means and the height is proportional to the amplitude of the periodic signal.

2. A low contrast measurement apparatus as described in claim 1 further including a sync means connected to said display means and said signal processing means to provide vertical and horizontal sync pulses thereto.

3. A low contrast measurement apparatus as described in claim 1 further including a low frequency mechanical chopper means position between said test pattern generation means and said video camera means, said chopper means causing the output signal from said signal processing means to become a series of vertical pulses with amplitudes proportional to said chopper means frequency.

4. A low contrast measurement apparatus as described in claim 1 further including an illumination means cooperating with a beamsplitter means, said beamsplitter means being positioned between said test pattern generation means and said video camera means, said illumination means providing a light signal to be combined with said periodic bar chart to provide a uniform d.c. bias.

5. A low contrast measurement apparatus as described in claim 1 wherein said predetermined frequency equals the fundamental frequency of said periodic bar chart.

6. A low contrast measurement apparatus as described in claim 2 further including a monitoring means receiving said video signal from said video camera means, said monitoring means providing a visual display of said periodic bar chart.

7. A low contrast measurement apparatus as described in claim 4 wherein said illumination means is variable said illumination means being varied to vary the contrast level of said periodic bar chart.

8. A low contrast measurement apparatus as described in claim 5 wherein said predetermined frequency equals 400 KHz.

* * * * *